United States Patent [19]

Hong et al.

[11] Patent Number: 5,787,212
[45] Date of Patent: Jul. 28, 1998

[54] OPTICAL COUPLER SENSOR WITH MOVABLE OPTICAL WAVEGUIDE

[75] Inventors: Song-Cheol Hong; Doo-Young Ha, both of Taejon, Rep. of Korea

[73] Assignee: Korea Advanced Institute of Science and Technology, Taejon, Rep. of Korea

[21] Appl. No.: 669,789

[22] Filed: Jun. 28, 1996

[30] Foreign Application Priority Data

Jun. 28, 1995 [KR] Rep. of Korea .................. 95-17827

[51] Int. Cl.⁶ .................................................. G02B 6/00
[52] U.S. Cl. ................................. 385/13; 250/227.27
[58] Field of Search ............................. 385/13, 141, 16; 250/227.27, 227.19, 234; 356/358, 345

[56] References Cited

U.S. PATENT DOCUMENTS 5,420,688  5/1995  Farah .......................... 250/227.27 X

*Primary Examiner*—Akm E. Ullah
*Attorney, Agent, or Firm*—Darby & Darby

[57] ABSTRACT

The present invention relates to an optical coupler sensor employing a fixed optical waveguide and a movable optical waveguide which allows detection of every small physical quantities and their changes with a high sensitivity, and a process for preparing the same. The optical coupler sensor of the present invention comprises: a fixed optical waveguide formed on a substrate and disposed along a predetermined path. A movable optical waveguide is linked to a cantilever formed on the substrate, which is moved up and down by an external force. The moveable waveguide is disposed outside of the predetermined path.

8 Claims, 4 Drawing Sheets

OPTICAL COUPLER SENSOR WITH MOVABLE OPTICAL WAVEGUIDE

FIELD OF THE INVENTION

The present invention relates to a novel optical coupler sensor, mole specifically, an optical coupler sensor employing a fixed optical waveguide and a movable optical waveguide which allows the detection of very small physical quantities and their changes with a high sensitivity and a process for fabricating the same.

BACKGROUND OF THE INVENTION

Sensors employing a capacitance have been chiefly used in the sensing and determination of physical quantities such as mass and displacement and so on, and the followings has been suggested in the art:

S. M. Sze teaches a sensor employing two electrodes forming a capacitor, where a physical quantity and its change are detected as a capacitance of the capacitor, after transformation of the physical quantity into a distance between the electrodes. Operation of the device is based on the fact that the capacitance is inversely proportional to the distance between the electrodes forming the capacitor(see: S. M. Sze, Semiconductor Sensors, 191(1994)).

However, the said prior art sensor has not been practically applied in the industry, since it determines the physical quantities based on the inverse relationship between the capacitance and the distance between the electrodes of the capacitor. This relationship works as a serious obstacle to determining the desired measurements with a high degree of sensitivity.

SUMMARY OF THE INVENTION

In accordance with the present invention, based on the finding that the output intensity of an optical coupler is in a sinusoidal relationship that it is exponentially changed against the distance between two optical waveguides and frequency of the optical coupler is changed against the distance with a high sensitivity, the inventors developed a novel optical coupler sensor which can sense and determine very small physical quantities and their changes.

A primary object of the present invention is, therefore, to provide a novel optical coupler sensor which can sense and determine very small physical quantities and their changes with a high degree of sensitivity.

The other object of the present invention is to provide a process for fabricating the optical coupler sensor in an efficient and simple manner.

BRIEF DESCRIPTION OF DRAWINGS

The above and the other objects and features of the present invention will become apparent from the following descriptions given in conjunction with the accompanying drawings, in which.

DETAILED DESCRIPTION OF THE INVENTION

An optical coupler sensor of the present invention where incident light is propagated along a predetermined path to cause optical coupling comprises:

a fixed optical waveguide formed on a substrate and disposed along said predetermined path and along which incidence, propagation and transmission of light are carried out;

a movable optical waveguide linked to a cantilever formed on the substrate, which is moved up and down by an external force, said moveable waveguide disposed outside of said predetermined path.

The optical coupler sensor may further comprise a tip and a high m ass of material evaporated on the movable optical waveguide for the determination of bents on the surface and the acceleration and universal gravitation of a material, respectively. Further, it may comprise a bimetal on the movable optical waveguide for the determination of temperature changes of a material.

The optical coupler sensor of the present invention is fabricated by a process which comprises the steps of:

(i) formation of a cladding layer on a substrate which is followed by the formation of a core layer on the cladding layer;

(ii) formation of a fixed optical waveguide by etching of the core layer;

(iii) formation of a support layer on the core layer;

(iv) formation of a cantilever and a movable optical waveguide linked thereto on the support layer; and, (v) formation of a cantilever support board by selective etching of the support layer.

In the process of fabricating of the optical coupler sensor of the invention, the support layer cantilever, optical waveguides and cladding layer are preferably made of $Si-SiO_2$ or GaAs-AlGaAs which differ in the rate of etching, for the selective etching of the support layer.

A preferred embodiment of the present invention is explained in detail with references of the accompanying drawings, which should not be taken to limit the scope of the invention.

Figure 1A:
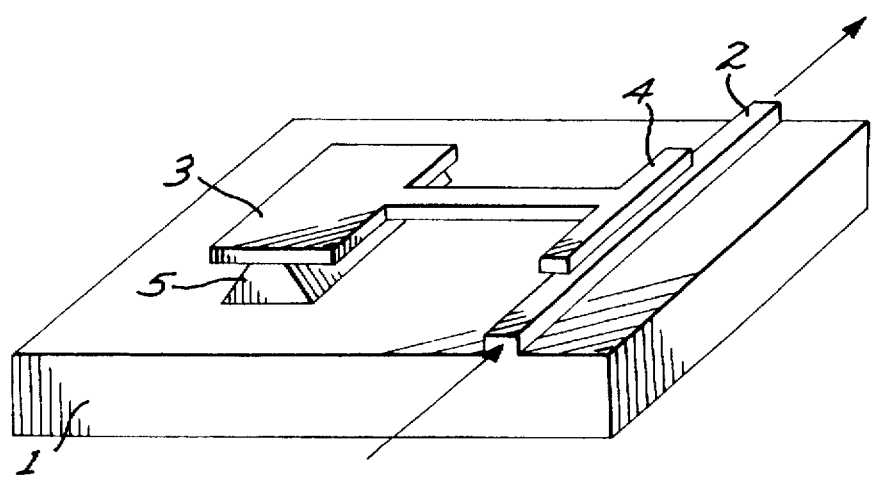
FIG. 1(A) is a schematic perspective view of an optical coupler sensor of the present invention.
Figure 1B:
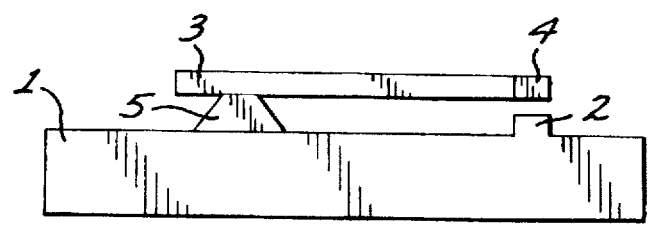
FIG. 1(B) is a schematic front view of an optical coupler sensor of the present invention.

FIGS. 1(A) and 1(B) are respective perspective and front views depicting an optical coupler sensor of the present invention. As depicted in FIGS. 1(A) and 1(B), the optical coupler sensor of the invention comprises a fixed optical waveguide(2) formed on a substrate(1); A movable optical waveguide(4) is linked to a cantilever(3) formed on the substrate(1), which moves up and down by an external force. The moveable waveguide is disposed apart from the fixed optical waveguide(2) at a distance, sufficient for the fixed optical waveguide(2) and the movable optical waveguide(4) to constitute an optical coupler. The cantilever(3) is supported on a cantilever support board(s) formed on the substrate(1).

Incidence, propagation and the transmission of light are carried out by the fixed optical waveguide(2), and a photodetector may be positioned nearby the waveguide(2) for sensing the output intensity of the fixed optical waveguide (2).

When an external force is subjected to the movable optical waveguide(4) linked to the cantilever(3), the movable optical waveguide(4) is moved up and down. At this time, the light incident on the fixed optical waveguide(2) is propagated to cause optical coupling at the point of the waveguide(2) which is positioned under the movable optical Waveguide(4), the light propagated through the fixed optical waveguide(2) at the end of the movable optical waveguide (4) is then transmitted to the end of the fixed optical waveguide(2) without a specific perturbation except for a little loss of power. The output intensity of the fixed optical waveguide:(2) is measured by a photodetector.

At this time, since the output intensity of the fixed optical waveguide(2) is changed sensitively, depending on the distance between the fixed optical waveguide (2) and the movable optical waveguide(4), the light intensity detected by the photodetector allows the efficient sensing of the external force with a high sensitivity.

Figure 2:
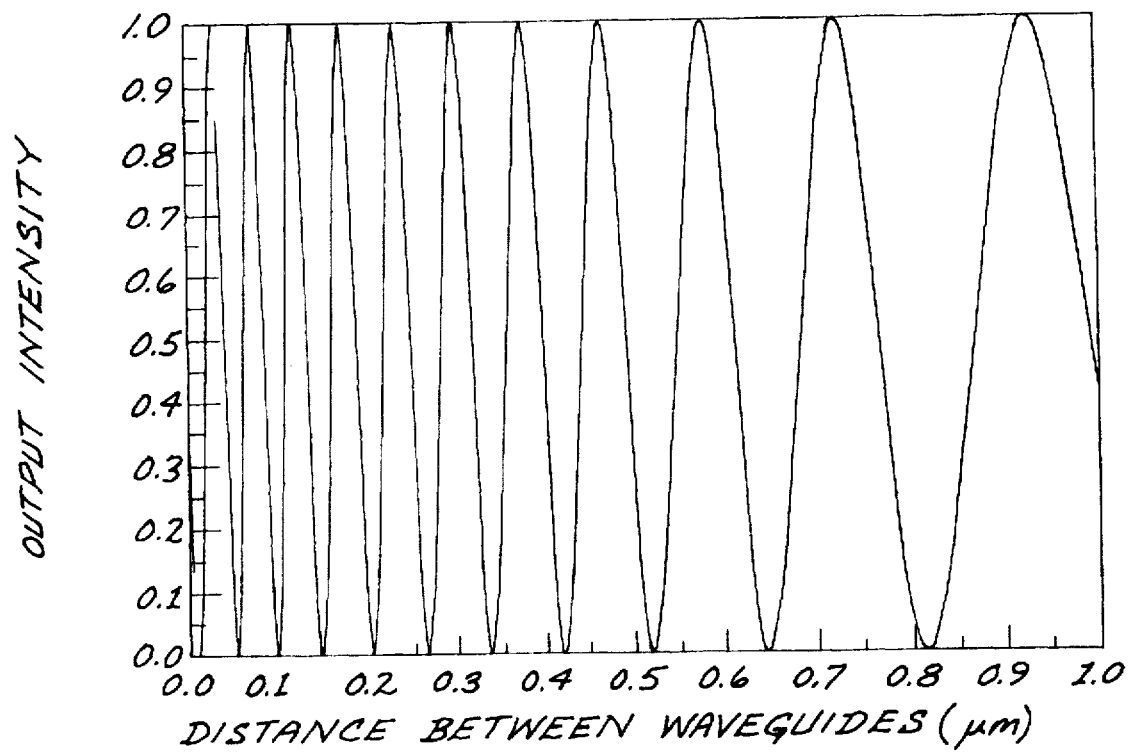
FIG. 2 is a graph showing the output intensity of light against the distance between optical waveguides of the optical coupler sensor of the invention.

FIG. 2 is a graph showing the output intensity of light against the distance between two optical waveguides(2, 4) of the optical coupler sensor of the invention. As can be seen in FIG. 2, it is clear that the:output intensity of light is in a sinusoidal relationship such that the frequency is exponentially changed depending on the distance between the two optical waveguides(2, 4). Accordingly, if a physical quantity and its change are transformed to a force which can move the movable optical waveguide(4) up and down they can be simply detected with a high sensitivity, based on the output intensity of the optical coupler sensor of the invention.

Figure 3:
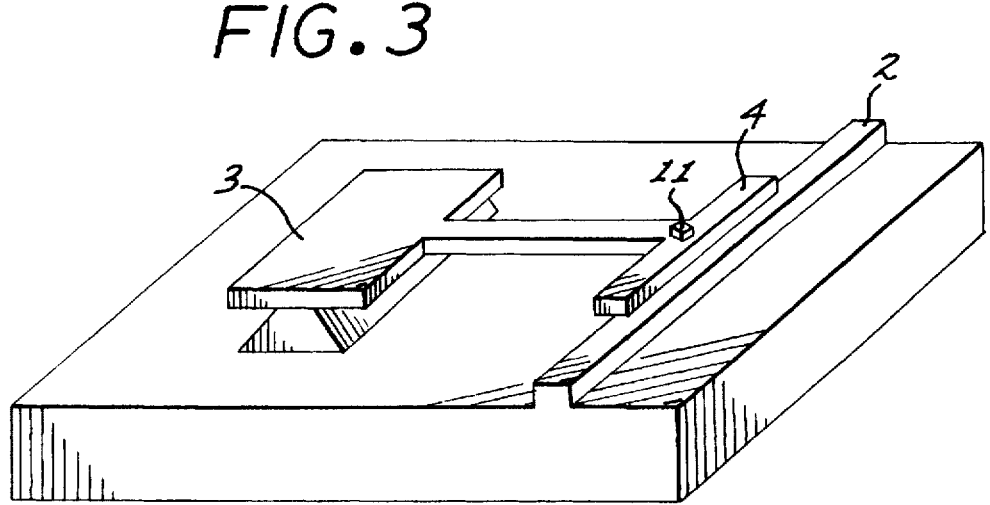
FIG. 3 is a schematic diagram showing an embodiment of weight measurement by the optical coupler sensor of the invention.

FIG. 3 is a schematic diagram showing an embodiment of the optical coupler of FIG. 1 performing a weight measurement of a material 11. As clearly shown in FIG. 3, the weight of the material(11) and its change can be measured with a high sensitivity, based on the determination of the output intensity of the fixed optical waveguide(2) according to the up-and-down movement of the movable optical waveguide (4) after positioning of the material(11) on the waveguide (4).

Figure 4A:
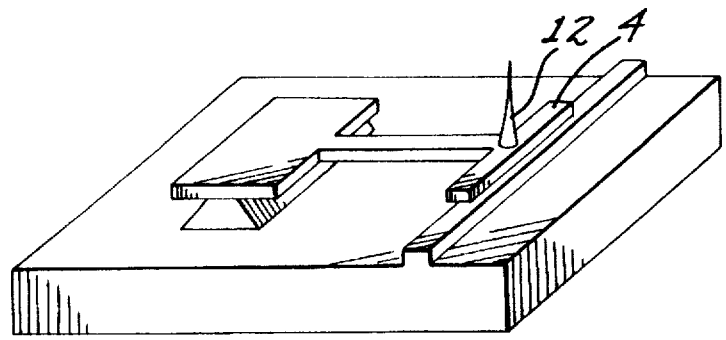
FIGS. 4(A) to 4(C) are perspective views of another examples of optical coupler sensors of the invention.

FIG. 4(A) is a perspective view showing an example of the optical coupler sensor of the invention, including a tip(12) on the movable optical waveguide(4), for the detection of bent areas on the surface of a material. The optical coupler of the invention can sense the displacement of the material, by detecting the bent areas on the surface of the material by the tip(12) formed on the movable optical waveguide(4) or by the linkage of the material to the tip(12) on the movable optical waveguide(4). The optical coupler sensor can be applied, for example, in an atomic force microscopic (AFM).

Figure 4B:
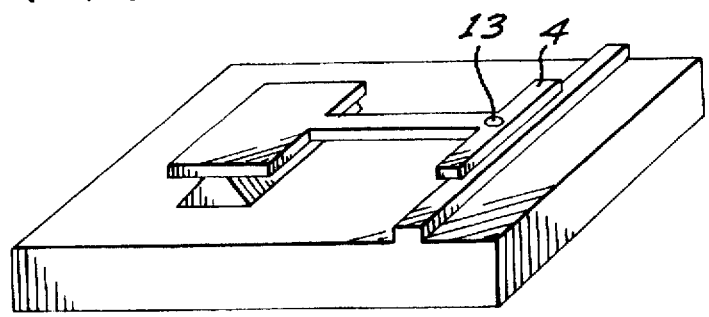

FIG. 4(B) is a perspective view showing a further example of the optical coupler sensor of the invention, where a high mass of material(13) is evaporated on the movable optical waveguide(4). The acceleration and universal gravitation of a material can be determined as up-and-down movement of the movable optical waveguide(4) by the acceleration and universal gravitation subject to the material (13) evaporated on the movable optical waveguide(4).

Figure 4C:
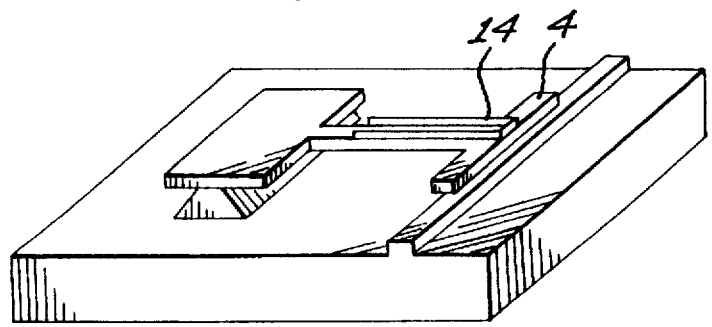
Figure 5A:
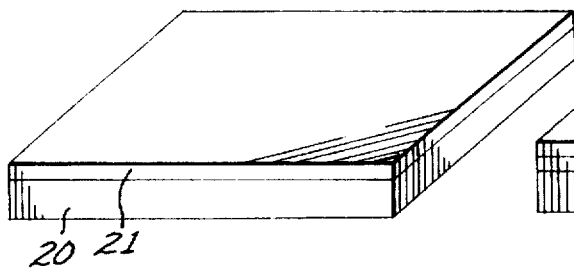
FIGS. 5(A) to 5(F) are schematic diagrams showing the fabrication process of an optical coupler sensor of the invention.
Figure 5B:
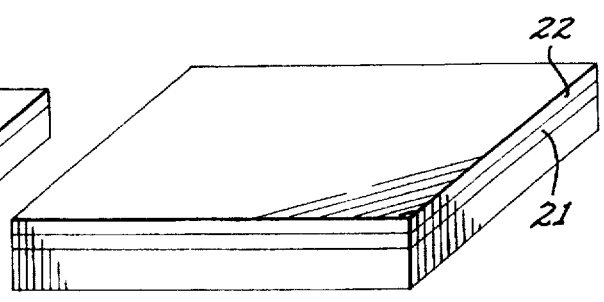
Figure 5C:
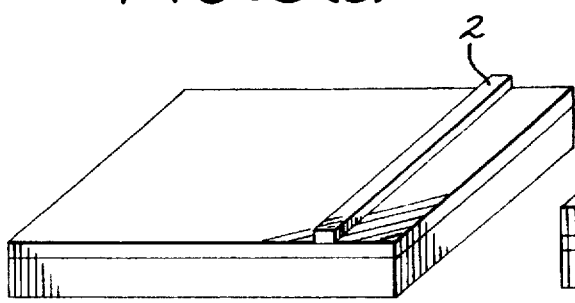
Figure 5D:
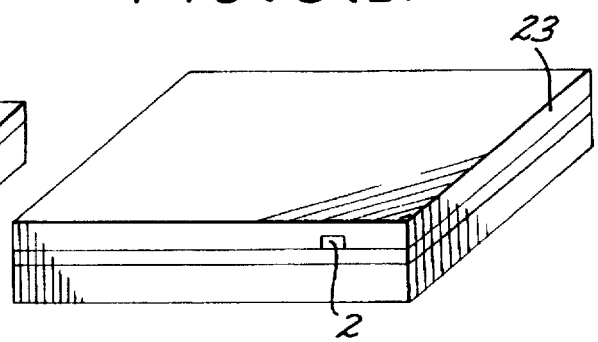
Figure 5E:
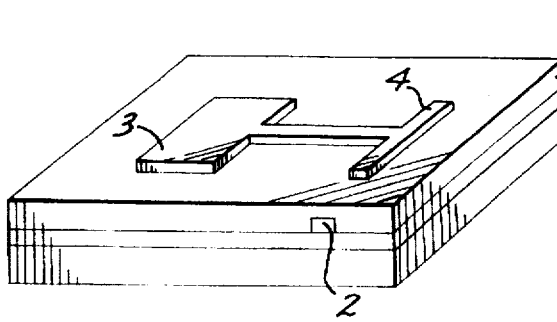
Figure 5F:
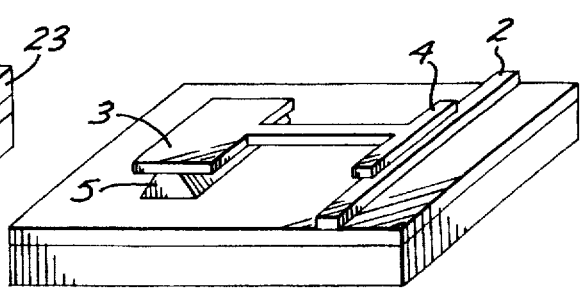

FIG. 4(C) is a perspective view showing another example of the optical coupler sensor of the invention, where a bimetallic element (14) is formed on the movable optical waveguide(4) for the determination of temperature changes of the material. Changes in the bimetallic element formed on the movable optical waveguide(4) by the temperature change of the material motivates the movement of the movable optical waveguide(4) which, in turn, allows the detection of the temperature change with a high sensitivity.

FIGS. 5(A) to 5(F) depict a fabrication process of the optical coupler sensor of the invention, which comprises the formation of a core layer(22) on the cladding layer(21) on which a substrate(20) is formed; formation of a fixed optical waveguide(2) by etching of the core layer(22); formation of a support layer(23) on the core layer(22); formation of a cantilever(3) and a movable optical waveguide(4) linked thereto on the support layer(23); and, formation of a cantilever support board(5) by selective etching of the support layer(23).

In the fabrication process of the optical coupler sensor of the invention, the support layer(23), cantilever(3), optical waveguides(2, 4) and cladding layer(21), are preferably made of Si-SiO$_2$ or GaAs-AlGaAs which differ in the rate of etching, for the selective etching of the support layer(23). More preferably, the substrate(20), cladding layer(21), core layer(22), support layer(23) and cantilever(3) and movable optical waveguide(4) are made of silicon, silica, boron doped silica, polycrystalline silicon and silica, respectively. Generally, the cantilever(3) and the cantilever support board (5) may be formed by the known micromachining method in the art(see: K. E. Petersen, IEEE Trans. electron Devices, ED25(10):1241–1250(1978)).

Although the preferred embodiments of the present invention have been disclosed for illustrative purposes, it will be apparent to those skilled in the art that certain changes and modifications can be made to this invention without departing from the spirit or scope of the invention as it is set forth herein.

What in claimed is:

1. A process for fabrication of the optical coupler sensor which comprises the steps of:
    (i) formation of a core layer on the cladding layer on which a substrate is formed;
    (ii) formation of a fixed optical waveguide by etching of the core layer;
    (iii) formation of a support layer on the core layer;
    (iv) formation of a cantilever and a movable optical waveguide linked thereto on the support layer; and,
    (v) formation of a cantilever support board by selective etching of the support layer.

2. The process for fabrication of the optical coupler sensor of claim 1 wherein Si is employed as the support layer, and SiO$_2$ is employed as the cantilever, optical waveguides and cladding layer, respectively.

3. The process for fabrication of the optical coupler sensor of claim 1 wherein GaAs is employed as the support layer, and AlGaAs is employed as the cantilever, optical waveguides and cladding layer, respectively.

4. An optical coupler sensor where incident light is propagated along a predetermined path to cause optical coupling, said sensor comprising:
    a fixed optical waveguide formed on a substrate and disposed along said predetermined path along which incidence, propagation, and transmission of light is carried out; and
    a movable optical waveguide linked to a cantilever formed on the substrate which is moved up and down by an external force, said movable waveguide being disposed outside of said predetermined path.

5. The optical coupler of claim 4 which further comprises a tip on the movable optical waveguide for the detection of bent areas on the surface of the material.

6. The optical coupler of claim 4 which further comprises a high mass of material evaporated on the movable optical waveguide for the determination of acceleration and universal gravitation of the material.

7. The optical coupler of claim 4 which further includes a bimetallic element formed on the movable optical waveguide for the determination of temperature changes in a material.

8. The optical coupler sensor of claim 4 wherein:
    said movable optical waveguide is disposed above said fixed optical waveguide.

* * * * *